March 29, 1960  C. VAN DER LELY ET AL  2,930,178
SIDE DELIVERY RAKE WITH GUIDE MEANS
Filed April 3, 1956  3 Sheets-Sheet 1

INVENTORS
CORNELIS VAN DER LELY
ARY VAN DER LELY

INVENTORS
CORNELIS VAN DER LELY
ARY VAN DER LELY

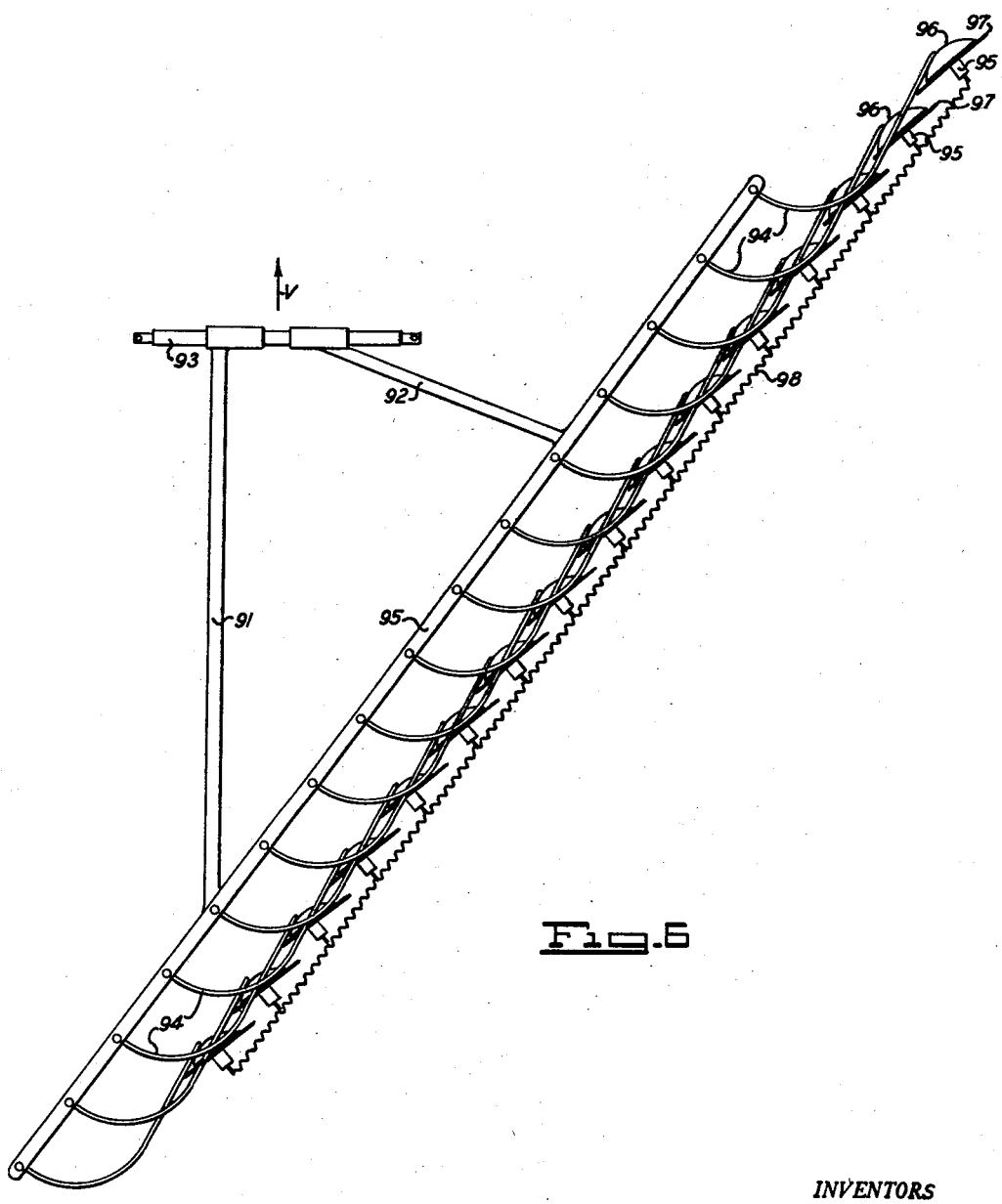

United States Patent Office 2,930,178
Patented Mar. 29, 1960

2,930,178
SIDE DELIVERY RAKE WITH GUIDE MEANS
Cornelis van der Lely and Ary van der Lely, Maasland, Netherlands, assignors to C. van der Lely N.V., Maasland, Netherlands, a Dutch limited-liability company
Application April 3, 1956, Serial No. 575,871
Claims priority, application Netherlands April 7, 1955
21 Claims. (Cl. 56—377)

The present invention relates to devices for laterally displacing material lying on the ground, and more particularly to devices provided with rake wheels or similar raking members.

Devices of this kind are generally known and are always provided with raking members having large diameters so that large swaths can be processed. Constructions requiring large rake wheels are, however, expensive and small rake wheels, in known constructions, cannot work crop which has accumulated to substantial heights.

It is an object of the present invention to provide a device in which relatively small rake wheels can work crop which has accumulated to a substantial height. According to the invention, rake wheels are provided with guides which do not rotate and which extend at least partially outside of the circumference of the rake wheel. A guiding of crop is provided which produces a very favorable effect because the associated raking members are relieved of much of the pressure of the crop due to a deflection thereof by the guide.

Figures 1, 2:
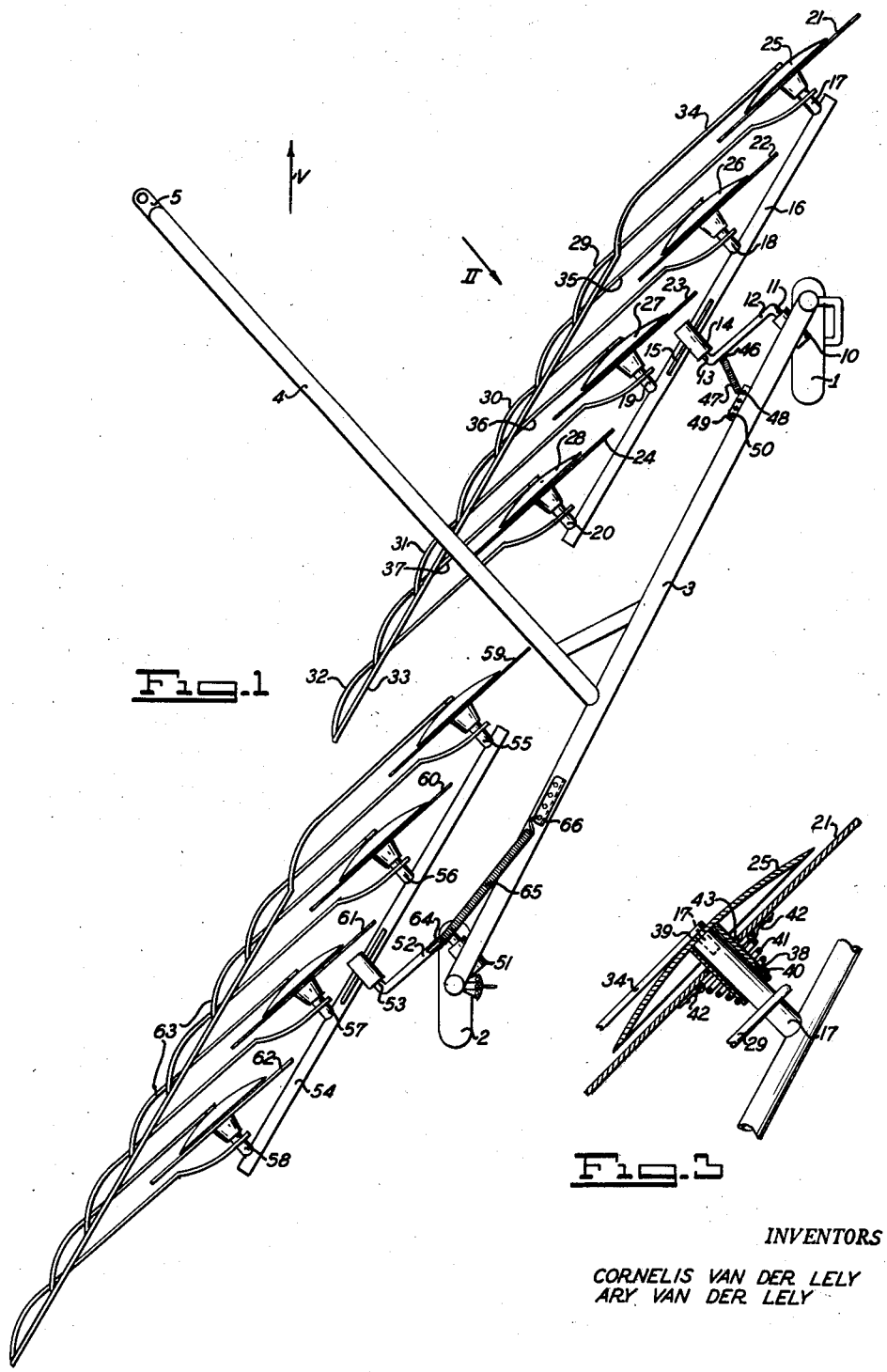
Figure 2:
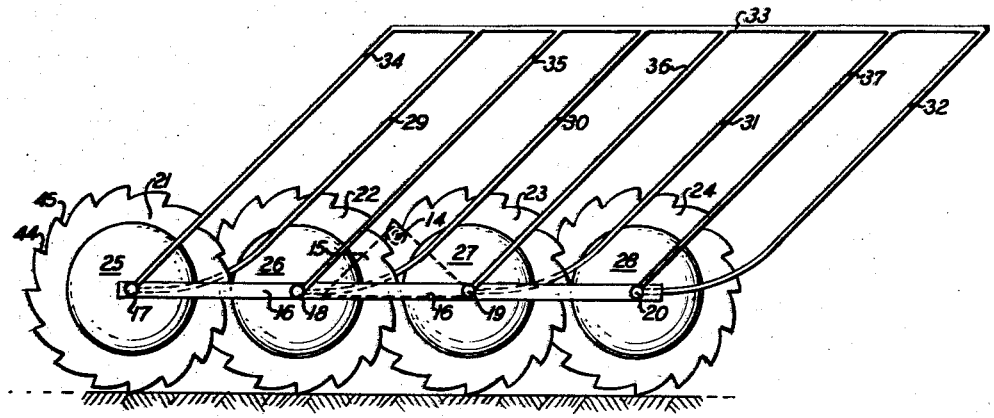

Other and further objects of the invention will be apparent in the following detailed specification taken in conjunction with the annexed drawings, in which:

Fig. 1 is a top plan view of a first embodiment of the invention.

Figure 4:
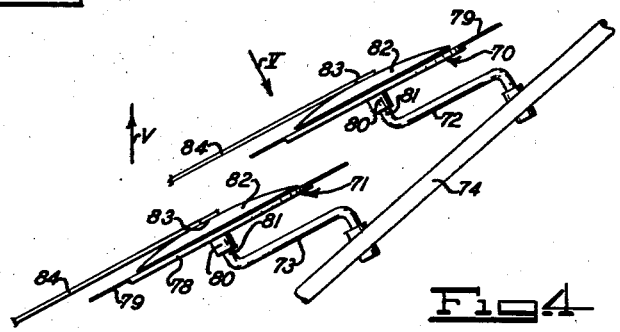
Figure 5:
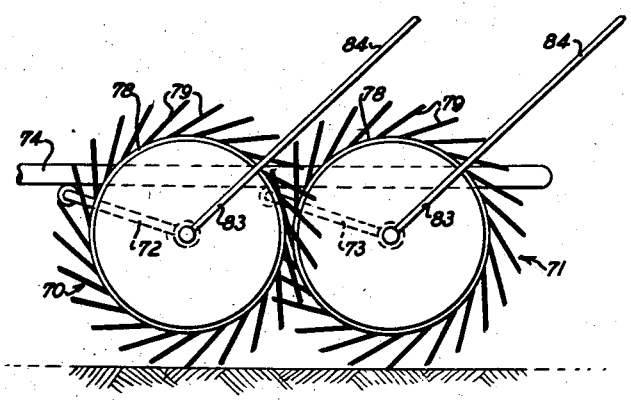

Fig. 2 is a side view of the device of Fig. 1 in the direction of arrow II in Fig. 1, Fig. 3 is an enlarged axial section of a raking member which is used in the side delivery rake of Figs. 1 and 2, Fig. 4 is a top plan view of another side delivery rake according to the invention, Fig. 5 is a view in the direction of arrow V in Fig. 4, and Fig. 6 is a top plan view of a third embodiment of the invention.

The side delivery rake in Figs. 1–3 is composed of a mobile frame beam 3 supported by two running wheels 1 and 2. The beam 3 can be pulled forward in the direction of arrow V by a draw arm 4 fixed to the middle of said beam 3. The foremost extremity 5 of said draw arm can be connected, for example, to the rear of a tractor. The running wheel 1 is a self-adjusting running wheel, whereas the plane of the running wheel 2 can be secured in different positions. The central position of wheel 2 is shown in Fig. 1.

The front end of beam 3 is provided with a bearing 10 for an axle 11 of a crank 12 carrying a crank pin 13. On the crank pin 13 is mounted a bearing 14 in which pin 13 can freely rotate within certain limits. The bearing 14 is rigidly connected by means of a triangular plate 15 (see Fig. 2) to a substantially horizontal bar 16 carrying four axles 17, 18, 19 and 20 which are parallel to the axle 11. Raking members 21, 22, 23 and 24 are mounted on and freely rotatable about said axles. For each raking member, a concave disc 25, 26, 27 or 28 is mounted on one of the axles 17—20. The discs 25—28 do not rotate with the raking members 21—24.

Thin curved bars 29, 30, 31 and 32, which extend obliquely upwards and backwards relative to direction V, are connected in cantilever arrangement to the axles 17, 18, 19 and 20, the upper extremities of said bars being connected by a thin horizontal bar 33. The lower ends of four further bars 34, 35, 36 and 37 are fixed to the discs 25, 26, 27 and 28, the upper ends of said bars being attached to the bar 33.

The upper parts of the bars 29—32 and 34—37 are substantially parallel, whereas the bars are substantially evenly spaced. When the bars 29—32 and 34—37 are moved in the direction V, said bars constitute a guide for the crop which is thus guided upwardly and to the side so that an accumulation of crop is avoided.

The four raking members 21—24 and associated structure have the construction shown for raking member 21 in Fig. 3. In Fig. 3, the lower end of the bar 29 is attached to the axle 17 on which is mounted a bushing 38 which constitutes the hub of the raking member 21. The concave disc 25 is secured rigidly, but releasably, to the outer extremity of the axle 17 by means of a fastening member 39. The bushing 38 has, at its rear, a groove 40 in which is clamped the narrow end 41 of a conical spring. The wide end of the spring is connected to the raking member 21 by means of a clip 42 secured on the raking member. The member 21 consists of a flat plate provided with a large hole 43 accommodating the bushing 38 and the plate includes a number of circumferential teeth 44 and 45 (Fig. 2). The raking member 21 can deviate resiliently from a position of equilibrium and, thus, the forces exerted thereupon remain within tolerable limits during forward movement over uneven terrain whereby the turf is not damaged.

For reducing the pressure of the raking members 21—24 on the ground, the crank 12 is connected at 46 to the lower end of a spring 47, the upper end of which engages an aperture 48 of a strip 49 fixed to the frame beam 3. Said spring can also engage aperture 50 for providing a different tension.

A bearing 51 for a crank 52 is attached to the frame beam 3 near the running wheel 2, a horizontal bar 54 being attached to the crank pin 53 of said crank 52. Said bar supports axles 55, 56, 57 and 58 on which raking members 59, 60, 61 and 62 are rotatably mounted. A system of bars 63 corresponding to the system of bars 29—37 constitutes a guide for delivering crop obliquely upwards and laterally, so that an accumulation of crop near the raking members 58—60 is avoided. The construction of the parts connected to the crank pin 53 of the crank 52 is identical with that of the parts connected to the crank pin 13 of the crank 12.

The construction of the cranks 12 and 52 is also the same, except that the crank 52 supports a vertical arm 64 to which is attached the extremity of a spring 65. The other end of the spring 65 is fixed to a perforated bar 66 attached to the frame beam 3. The function of the spring 65 is the same as that of the spring 47.

For operation, the front end 5 of the draw arm 4 is fastened to a tractor and the device is driven in the direction V over a field on which crop is spread or on which lies a swath of crop previously raked together, said swath extending in the direction V. The raking members 21—24 and 59—62 are rotated by contact with the ground or the crop, and material is delivered to the left by said raking members. This delivery, however, is only possible because of the guides which prevent accumulation of material at the uppermost sides of the rake wheels. The cranks 12 and 52 permit an adaptation of the raking members in groups of four to the ground.

According to Figs. 4 and 5, a number of small raking members such as members 70 and 71 are mounted an a frame beam 74 by means of an equal number of cranks 72 and 73. The raking members consist of round discs 78 provided with flexible circumferential tines 79. The members 70 and 71 are mounted for free rotation on hubs 80 on crank pins 81.

A concave disc 82 opening towards and substantially covering the front of the associated disc 78 is releasably connected to each crank pin 81 such that said concave disc 82 cannot rotate about the crank pin 81. Each concave disc 82 is fixedly attached to the lower end 83 of a steel bar 84. Said bars 84 constitute the guides along which the crop is urged upwards during operation.

In Fig. 6, the guides constitute the only connection between the rotating raking members and the frame. In this structure the device includes a light-weight frame beam 90 making an angle with the direction of travel V and connected by means of two light-weight bars 91 and 92 to a transverse beam 93 which is readily attached to conventional lifting devices on conventional tractors.

The frame beam 90 supports, for example, sixteen curved bars 94 made of spring steel. The fastening of said bars 94 to beam 90 is such that the upper attached ends cannot move relative to the beam 90; the lower ends, however, have a certain freedom of motion due to the resiliency of the bars. The lower end of each bar 94 is connected to a concave disc 96 coupled rigidly but releasably with an axle 95 and having its convex side directed forwardly. Each bar 94 is connected to a separate disc 96. A small raking member 97, which can be one of those described above, is rotatable on each axle 95. The rear-most ends of the axles 95 are connected to a long helical spring 98 made of spring steel.

The device shown in Figs. 6 and 7 works in the same way as do the devices previously described such that the crop is pushed aside and led upwards by the bars 94 so that there is no accumulation near the rotatable members 97. These members, therefore, only need to work the crop lying between the crop stubble and to pass the crop to the next raking member, said crop being delivered to the left with the crop which is rolled and pushed along by the bars 94.

The large number of raking members in the latter structure and their resilient fastening permit a very favorable adaptation to rough terrain and enable the device to rake short crop. By the light construction of the frame and the large number of raking members, the pressure with which each raking member rests on the ground is so small that a pressure reducing device is not necessary; if desired, however, such a device could easily be mounted on the rake.

As appears in Fig. 6, the obliquely extending lower parts of the guides 94 have a backward direction relative to planes perpendicular to the axles 95 and comprising the lower ends of the guides 94. Consequently, the guides 94 constitute together a scooping mechanism, due to which the crop is lifted from the ground.

There will now be obvious to those skilled in the art, many modifications and variations of the structures set forth which do not depart essentially from the spirit of the invention as defined in the following claims.

What we claim is:

1. A device for displacing material lying on the ground comprising a mobile frame for traversing the ground, a raking member operatively associated with said frame for engaging material on the ground traversed, and a guide operatively associated with said raking member and extending upwardly and laterally away from said member to guide the engaged material away therefrom.

2. A device as claimed in claim 1 wherein said frame has a normal determinable direction of travel and said raking member is arranged obliquely to said direction, the guide extending rearwardly relative to said direction.

3. A device as claimed in claim 2 comprising an axle on said frame supporting said member for rotation and defining an axis of rotation for the member, said guide including upper and lower extremities the lower of which is positioned adjacent said member at the axis of rotation.

4. A device as claimed in claim 3 wherein said axle is mounted on said frame.

5. A device as claimed in claim 3 comprising a crank mounted on said frame and wherein said axle is connected to said crank.

6. A device as claimed in claim 3, wherein said guide is coupled to said frame, comprising means coupling said axle to said guide for the support of said member.

7. A device as claimed in claim 4, wherein said axle is fixed on said frame, comprising a hub rotatable on said axle and connected with said member for the rotation thereof.

8. A device as claimed in claim 4 comprising a disc fixed to said axle, said guide being fixed to said disc.

9. A device as claimed in claim 5 comprising a disc fixed to said axle, said guide being fixed to said disc.

10. A device as claimed in claim 6 wherein said means is a disc connected between said axle and said guide.

11. A device for displacing material lying on the ground comprising a mobile frame for traversing the ground, a plurality of raking members in overlapping relationship operatively associated with said frame for engaging material on the ground traversed, and guide means operatively associated with said raking members and including bars individually associated with said members and extending upwardly and laterally away therefrom.

12. A device as claimed in claim 11, wherein said bars are operatively associated with said members in cantilever arrangement whereby each bar has a free extremity, said guide means including a bar connecting the free extremities.

13. A device as claimed in claim 11 where said frame includes a beam, running wheels supporting said beam, cranks mounted on said beam and horizontal bars mounted on said cranks, said raking members being operatively associated with the horizontal bars.

14. A device as claimed in claim 11 comprising axles on said frame, each axle supporting a raking member for rotation and including an outer extremity, and discs mounted on the outer extremities of the axles, the raking members being mounted between the discs and the frame; said bars being operatively associated in pairs with each raking member, one bar of each pair being connected to the associated disc and the other bar to the associated axle, the bars of each pair being connected to the latter said axle and disc on opposite sides of the raking member.

15. A device as claimed in claim 11 comprising axles on the frame for supporting said raking members, and a disc and resilient means on each axle sandwiching the raking member therebetween.

16. A device as claimed in claim 11, wherein said bars couple said raking members to said frame, comprising discs coupled fixedly to said bars, and axles coupled to said discs for supporting said raking members for rotation, said bars being connected to said frame.

17. A device as claimed in claim 11 wherein said bars are flexible and resilient.

18. A device as claimed in claim 11 wherein said raking members are freely rotatable rake wheels which are rotated by contact with the ground and crop lying thereupon.

19. A device as claimed in claim 16 comprising resilient means coupling all of said axles.

20. A guide for a rake using a rotatable raking member comprising a curved bar extending upwardly and laterally away from said raking member.

21. A guide for a rake using a plurality of raking members comprising a plurality of curved bars extending upwardly and laterally away from said raking members, and a further bar connecting all of said curved bars.

References Cited in the file of this patent

UNITED STATES PATENTS

| | | |
|---|---|---|
| 2,255,288 | Jones et al. | Sept. 9, 1941 |
| 2,447,354 | Morrill | Aug. 17, 1948 |
| 2,712,723 | Ryan | July 12, 1955 |